(12) United States Patent
Paes

(10) Patent No.: US 10,115,244 B2
(45) Date of Patent: Oct. 30, 2018

(54) TIMING SYSTEM

(71) Applicant: Speed System AG, Zug (CH)

(72) Inventor: Wolfgang Alexander Paes, Stein am Rhein (CH)

(73) Assignee: SPEED4 SYSTEM AG, Zug (CH)

( * ) Notice: Subject to any disclaimer, the term of this patent is extended or adjusted under 35 U.S.C. 154(b) by 7 days.

(21) Appl. No.: 15/116,322

(22) PCT Filed: Jan. 28, 2015

(86) PCT No.: PCT/EP2015/000156
§ 371 (c)(1),
(2) Date: Oct. 21, 2016

(87) PCT Pub. No.: WO2015/117734
PCT Pub. Date: Aug. 13, 2015

(65) Prior Publication Data
US 2017/0039780 A1 Feb. 9, 2017

(30) Foreign Application Priority Data
Feb. 7, 2014 (DE) .......... 10 2014 001 544
Oct. 24, 2014 (DE) .......... 10 2014 015 689

(51) Int. Cl.
G04F 13/02 (2006.01)
G04F 10/00 (2006.01)
(Continued)

(52) U.S. Cl.
CPC .......... G07C 1/24 (2013.01); G01V 8/22 (2013.01); G01V 11/00 (2013.01); G04F 10/00 (2013.01); G04F 13/02 (2013.01); G07C 1/22 (2013.01)

(58) Field of Classification Search
CPC .......... G04F 10/00; G04F 13/02; G07C 1/20; G07C 1/24; A63B 69/0028; A63B 71/06; A63B 71/0686; G01V 8/22; G01V 11/00
See application file for complete search history.

(56) References Cited

U.S. PATENT DOCUMENTS 4,074,117 A * 2/1978 DeLorean .......... G04C 23/50
340/323 R
4,645,458 A * 2/1987 Williams .......... A63B 69/0053
273/446

(Continued)

FOREIGN PATENT DOCUMENTS

DE 2947135 A1 6/1980
WO WO-2005/005000 A1 1/2005

OTHER PUBLICATIONS

International Search Report and Written Opinion for International Patent Application No. PCT/EP2015/000156, dated Sep. 23, 2015, together with English translation, 19 pages.

(Continued)

Primary Examiner — Vit W Miska
(74) Attorney, Agent, or Firm — Womble Bond Dickinson (US) LLP

(57) ABSTRACT

The invention relates to a timing system for measuring a runner's (2) running time between two presence points (3) of the runner's running path, comprising a measurement beam receiver (MSE (5)) and a measurement beam emitter (MSG (6)). The measurement beam (8) from these intersects said running path. When reception of the measurement beam is interrupted, presence signals are generated for the runner that are evaluated in the timer (8) in order to acquire and output the running time. In a running path with a turn-around between a start/finish line (SZL (10)) and a turn-around point (4.3), or a running path that is undulating to zig-zagged, the measurement beam receiver MSG (beam source (Continued)

6.2, mirror 6.1) is situated at the ends of said running path. Presence signals are generated at the turn-around point (4.3) and/or at least one of the turning points (3) of said running path. In addition, the pairing of an additional measurement beam receiver [start/finish MSE (5.2)] and beam source (6.2), with a measurement beam perpendicularly intersecting the running path, can be arranged on the start/finish line (10) and is preferably integrated into a shared timer unit (9).

21 Claims, 3 Drawing Sheets

(51) Int. Cl.
      *G07C 1/24*       (2006.01)
      *A63B 69/00*     (2006.01)
      *G07C 1/22*       (2006.01)
      *G01V 8/22*       (2006.01)
      *G01V 11/00*     (2006.01)

(56) References Cited

U.S. PATENT DOCUMENTS

| | | | | |
|---|---|---|---|---|
| 5,241,487 | A * | 8/1993 | Bianco | G04F 8/08 |
| | | | | 340/323 R |
| 7,508,739 | B2 * | 3/2009 | Paes | A63B 69/0028 |
| | | | | 235/377 |
| 9,375,627 | B2 * | 6/2016 | Hansen | G07C 1/24 |
| 9,495,568 | B2 * | 11/2016 | Hansen | G07C 1/24 |
| 2007/0258333 | A1 * | 11/2007 | Paes | A63B 69/0028 |
| | | | | 368/9 |
| 2012/0082007 | A1 | 4/2012 | Duxbury | |

OTHER PUBLICATIONS

International Search Report and Written Opinion for International Patent Application No. PCT/EP2015/000157, dated Sep. 23, 2015, together with English translation, 19 pages.

* cited by examiner

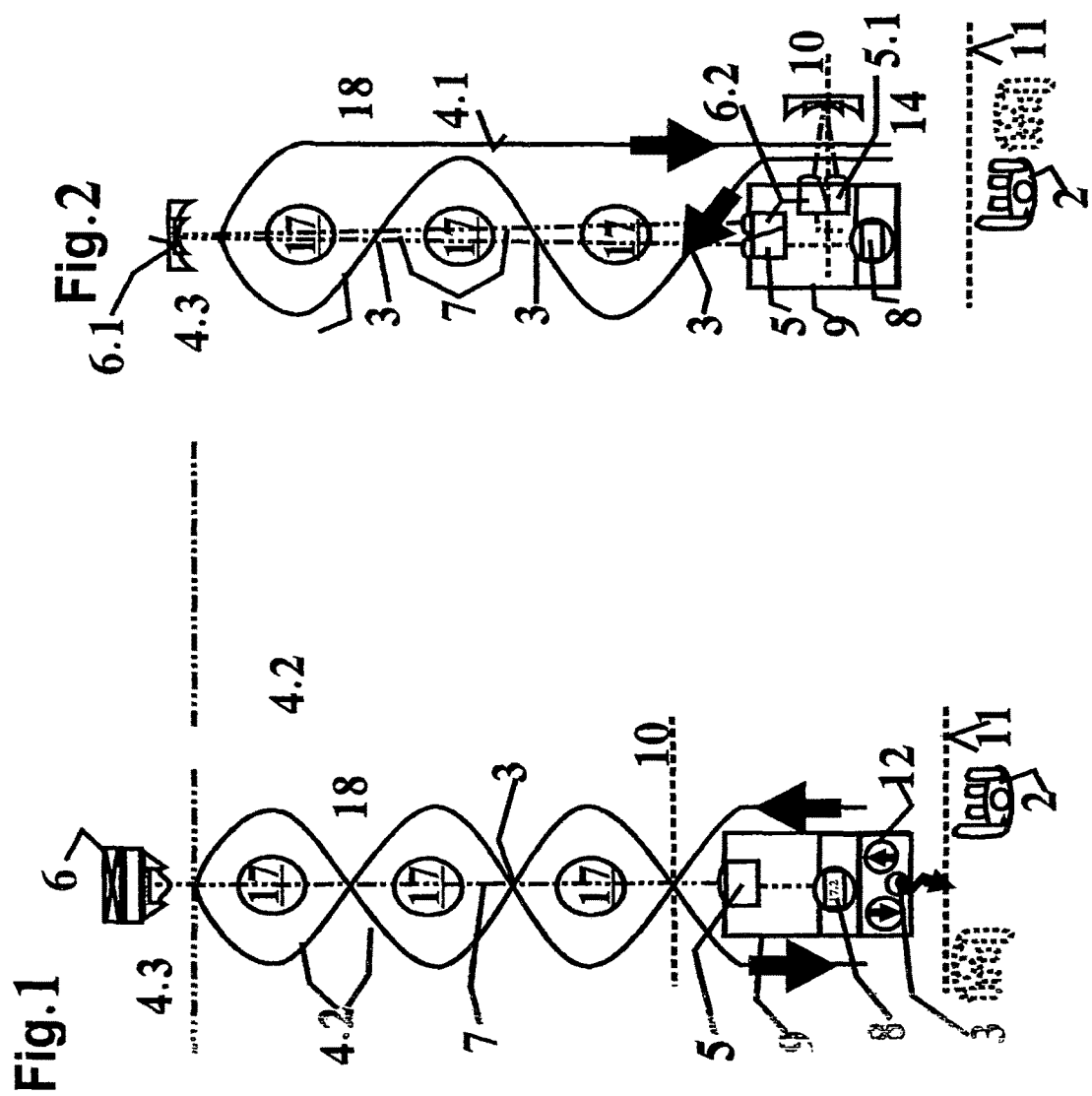

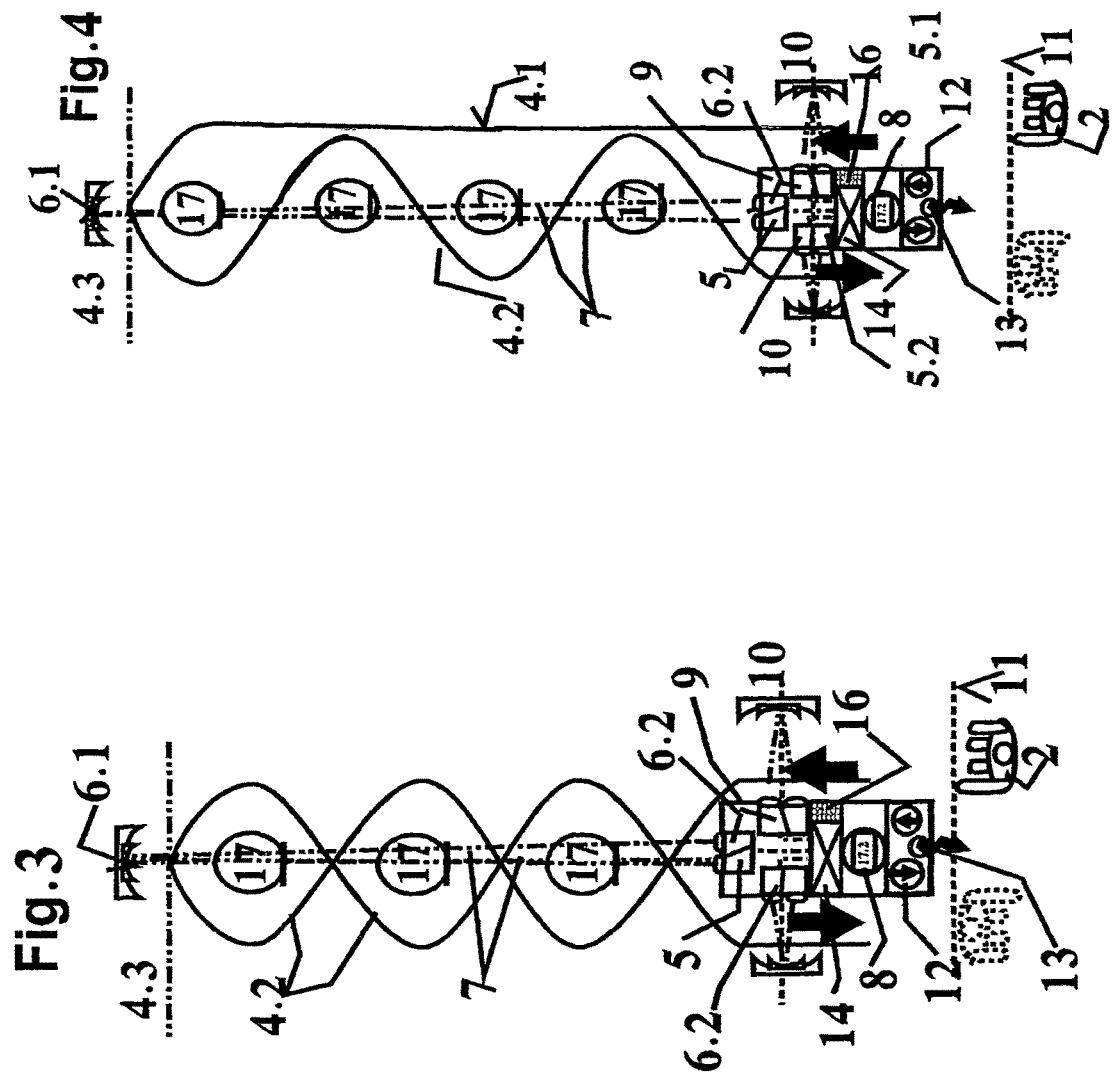

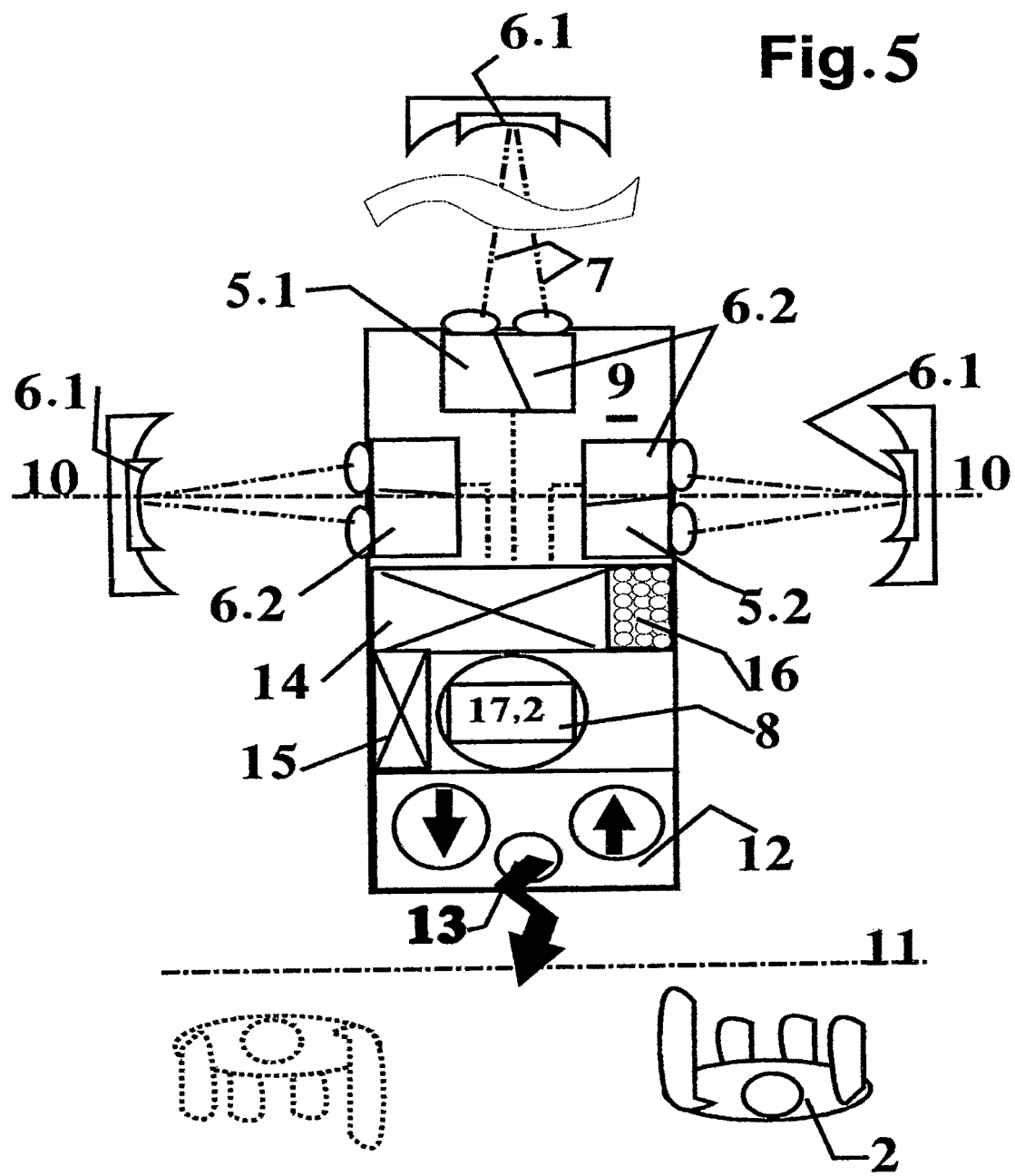

TIMING SYSTEM

CROSS-REFERENCE TO RELATED APPLICATION

This application is a national stage application filed under 35 U.S.C. 371 of International Application No PCT/EP2015/000156, filed Jan. 28, 2015, which claims priority from German Patent Application No. 10 2014 001 544.0, filed Feb. 7, 2014, and German Patent Application No. 10 2014 015 689.3, filed Oct. 24, 2014, each of which is incorporated by reference herein in its entirety.

BACKGROUND/BRIEF SUMMARY

The invention relates to a timing system for measuring the running time of a runner. Such a timing system can be found in any running competition to generate a presence signal of the runner between two presence points of a prespecified running path, for example the start signal and the finish signal, and to determine the running time between the presence signals by means of the timer. The presence signals can be given by hand and the timer can be started and stopped by hand. In automatic mode, a measurement beam receiver (MSE) and a measurement beam emitter (MSG) are placed at each point at which the presence is to be detected, to generate the presence signal, wherein the measurement beam thereof crosses the running path at the presence points. This measurement beam can be a beam of light, in particular an infrared or laser beam, an ultrasonic wave beam, or a radio wave beam. When the receipt of the measurement beam is interrupted, a presence signal of the runner is generated. Each presence signal is then fed to a timer which is shared by all presence points, which is electrically connected by cable to all of the measurement beam receivers (MSE) in such a manner that the timer can be controlled by the presence signals to detect and output the running time between the presence signals.

If multiple presence points are specified by the type of running path, cabling is therefore required for the timing system, but is nearly impossible to accommodate in sports fields or playgrounds, and in any case is a hindrance.

This is especially true if the path is folded or has a wavy contour (i.e., within the scope of this application: wavy or zigzag). A folded running path in the context of this application consists of an outward leg and a return path of preferably equal length. In this case, it is then necessary to monitor the turnaround area to determine that the runner passes around the predetermined turnaround point. If the running path is wavy, the runner must run around pylons on the outward leg and/or on the return path, said pylons placed in more or less regular intervals. In these cases, presence signals must also be used to check whether the runner appears at the inflection points of this predetermined running path.

The problem addressed by the invention is therefore that of creating a timing system which does well in a complicated or folded path without cabling, and which can be easily set-up, used, and operated without complicated instructions.

This solution is found in one embodiment of the present invention. This solution can particularly be used in a running path with is folded and/or wavy in shape between a start/finish line (SZL) and a turnaround point.

The measurement beam receiver and measurement beam emitter are then placed opposite each other at the ends of the running path such that they incorporate these ends between them in such a manner that the measurement beam of the measurement beam emitter is oriented in the direction of the running path, and intersects the running path at least at one presence point of the runner—that is, the turnaround point and, in the case of wavy or zigzagging running paths, also at the inflection points of the running path.

This timing system has the advantage that, despite the complicated running path, all predetermined presence points can be captured, including all inflection points of the wavy line, all turnaround points, and the start and finish.

In this form, the timing system is particularly suitable for game purposes and training purposes, when the runner proceeds along a wavy line and is intended to move a ball along this wavy line.

In the simplest case, the starting point of the path for which the time is measured is one of the inflection points of the wavy line—preferably the first inflection point, which is adjacent to the MSE. The endpoint can be any other inflection point or the turnaround point, or the inflection point which marks the start.

It is very simple to set up the timing system because only one MSG and MSE needs to be placed at each end of the running path for which the time is measured. In this case, the MSG can be operated with a constant current source, for example a battery. The timer, in contrast, is only connected to the MSE. For this reason, both the timer and the MSE can be housed in a single box together—that is, a central unit with a shared power supply, for example a battery. It is not necessary to lay out cables.

The implementation of the invention according to another embodiment is particularly suitable as a timing system when a straight—that is, not a wavy—running path is desired for the outward leg and/or the return path of the folded running path. Despite the increase in the number of the MSEs, in this implementation the ZMA is not additionally complicated, since all of the MSEs can be housed together in a single box. This is termed a 'central unit' in this application. For this reason, it is possible in this case as well to set up and operate the timing system without any special training. The central unit is placed in the area of, or even on, the start line. The start MSE is placed at the start line oriented perpendicular to the running direction, and receives a beam from an additional MSG—that is, a beam source or mirror—which is also placed at the start line, but on the other side of the running path. The MSE which captures the turnaround point and optionally the inflection points of the wavy running path is situated on the front side of the central unit facing the running path.

It is an object of the invention that the timing system is as versatile as possible—that is, can particularly be used for different types of running paths and games. The implementation according to another embodiment serves this purpose. In this implementation, it is possible to separate the start and finish. At the start, the runner, facing the running direction, stands in front of the central unit. After the start signal, he passes by, for example, the right side of the central unit and is detected by the start MSE of the central unit at the start line, with a first presence signal. The clock starts at this moment. The rest of the running path can then be wavy or straight.

At the latest, the next detection is performed by the longitudinal-MSE in the turnaround area. In addition, the runner can be detected at each of the inflection points if, in this case, a wavy path is prescribed. Finally, the running path is set up such that the runner passes the finish line on the other side of the central unit, generating a presence signal which marks the end of the running path and triggers the time count. In addition, the time can be counted for the intervals from one presence signal to the next—that is, between two successive presence signals.

The implementation according to another embodiment ensures that a given path must be followed. If, for example, it is specified that the start of the running path is on the right side of the central unit, the running path must end on the other side; if it does not, an error signal is output, and/or there is no time measurement and an error is consequently detected.

Another embodiment makes it easier to carry out the game or running course without the referee or trainer performing a manual operation. In addition, the embodiment also makes it possible to determine the reaction time of the runner by measuring the time between the appearance of the right and/or left signal and the passage through the indicated start line. Similarly, an error signal can be output if the runner is not present at the start line within a predetermined target time, or if the runner starts his running path on the wrong side of the central unit against the indications of the right/left signal.

The implementation according to another embodiment aims to make the operation of the central unit, and the running course and/or game itself, further independent of the involvement of an overseer, referee, trainer, etc.

Since the invention allows a high degree of automation of the game event, it is further proposed that the central unit also has a microprocessor, to which are fed the presence signals of MSE integrated into the central unit, for the calculation and outputting of time intervals.

The implementation according to another embodiment also enables the saving of running paths and/or game profiles in the central unit in advance, as well as the easy retrieval and monitoring thereof.

The programs of the games or running paths can in particular be stored in such a manner that the origin of the presence signals from the MSEs (start or finish MSE, longitudinal MSE), the chronological sequence of these presence signals, and the number of the presence signals are saved as target specifications in the memory of the microprocessor of the central unit. During the run, it is then possible, using the comparison between the target and the actual data to determine whether the runner has kept to the prespecified running path.

In the embodiment according to another embodiment, it is possible to prespecify different running paths, wherein the basic programs thereof are already stored in the microprocessor memory.

The measurement beam emitter according to this invention can be a beam source, light source, laser source, ultrasound transmitter, or the like. It is assumed that such transmitters can be purchased commercially as small units which can be set up at the appropriate positions and oriented toward the respective associated MSE.

A further simplification is achieved by another embodiment. In this case, a separate power supply for the MSG is no longer required. Rather, each MSG is divided into a beam source (SQ) and a mirror. The SQs are integrated into the central device in the area of the associated MSEs. All SQs and MSEs of the central unit can then be connected to a shared power supply, for example a battery, which is also plugged into the central unit. Each mirror assigned to an SQ as the MSG is situated outside of the central unit such that the measurement beam of the SQ strikes the mirror and is reflected in the direction of the associated MSE.

Such beam sources can be laser beam sources which are conventional at this time. They allow a sharp focusing of the measurement beam and thus an accurate output of the presence signal in response to the presence of the runner.

Another further feature of the invention for the purposes of facilitating the set-up of the timing system and an automation of the game/sport is given in another embodiment. The beam source, preferably a laser beam source, serves in this case as a rangefinder as well. This can be done by measuring the angle between the light beam incident in the mirror and the light beam reflected on the MSE, and calculating a distance of the mirror from the central unit from this angle, based on the given geometrical arrangement of SQ and MSE. Alternatively, the SQ can also be operated in a pulsed manner. The microprocessor captures the time when the pulse is emitted, and the arrival time of the reflected signal in the MSE, such that the running time of the beam pulse between the MSE and the beam source, and from this, the travel of the beam pulse, can be determined. The determined distance is preferably compared in the microprocessor to a saved target specification of the distance, and if there is a discrepancy, an error signal is output, or the evaluation of one or more presence signals is blocked.

The embodiments described above have in common, as a solution to the task named above, a timing system for timing the running time of a runner on a running path between two presence lines which intersect the running path, with detection devices for detecting the presence of the runner on each of the presence lines, wherein the detection devices comprise:

a light beam source, the constant or constantly pulsating light beam of which is oriented along the presence line and intersects the running path on a measurement axis which is perpendicular to the presence line, a reflector which is arranged in the light beam and reflects the light beam as the measurement beam along the presence line, a measurement beam receiver (light beam receiver) which is arranged in the direction of the reflected measurement beam on the presence line and generates, when the receipt of the measurement beam is interrupted, a presence signal of the runner which is transmitted to the timer in the timing system as a switching signal, wherein the light beam source (6) and the light beam receiver (7) are unified structurally into a signal pairing (5).

According to the invention, a unit is placed before the head of the running path which contains the timing system, and the running path is laid out in such a manner that all signal pairings (each consisting of a light beam source and a light beam receiver) which are necessary for detecting the presence of the runner on the prespecified presence lines are integrated into the unit and arranged on at least one of the outer sides of the unit which faces the running path.

BRIEF DESCRIPTION OF THE SEVERAL VIEWS OF THE DRAWING(S)

Embodiments of the invention are described with reference to the drawings in the following, wherein:

FIGS. 1-4 show different configurations of timing systems adapted to prespecified running paths, and FIG. 5 shows a detailed view of the timing system according to FIG. 4.

DETAILED DESCRIPTION

In the following, functionally identical parts are provided with the same reference numbers. The timing system of FIG.

1 comprises a central unit 9 and a beam source 6.2 as the measurement beam emitter MSG.

The central unit is a box or a rectangular housing 9. It is placed between the start/finish line 10 and the standby line 11. The runner 2 waits outside of this area before the standby line 11.

The central unit 9 includes an MSE 5 which is oriented in the running direction. Opposite thereof, beyond the turnaround line 4.3, lies the measurement beam emitter MSG in the form of a beam source 6.2. The runner must pass around three pylons 17 along his running path, such that he runs past the central unit 9 on the right on the outward leg (in FIG. 1), and on the left on the return path, and—beginning and ending at the start/finish line 10—travels a wavy running path around the pylons 17 both on the outward leg and on the return path, and turns around at the turnaround point 4.3.

Along his wavy running path, the runner first crosses the measurement beam of the MSQ at the line 10. As a result, the measurement beam is interrupted and the MSE generates a presence signal which is transmitted via an electrical connection to the timer 8 as a start signal.

The central unit 9 contains, in addition to the measurement beam receiver and the timer 8, a light system with the direction light 12 which—controlled by hand or by a random number generator (both not shown)—outputs a right signal or a left signal, and also with a standby light 13 to output a standby signal. This standby light 13 is also connected to the timer 8 to relay the standby service signal.

The MSE 5 at the front of the central unit receives the presence signal every time the runner crosses the measurement beam of the beam source 6.2—that is, both (substantially) at the inflection points 3 and at the turnaround point 4.3 of his running path. These signals are also transmitted to the timer. As such, during the run of the runner 2, the standby signal on the one hand, and the first presence signal at the start line 10 on the other hand are directed to the timer. The timer detects intervals in between separately as the reaction time of the runner. Starting with the presence signal at the start line 10, the timer continues to detect the time intervals between the subsequent individual presence signals at the further inflection points 3 and at the turnaround point 4.3. These time intervals can be accessed individually; in addition, they are added to the total time needed by the runner before appearing at the line 10. The line 10 at which the runner crosses the measurement beam of the MSQ 6.2 twice thus serves both as a start line and a finish line.

In the following description of the further embodiments, only the unique features of these embodiments are particularly emphasized; otherwise, the foregoing description applies here as well.

The central unit 9 according to FIG. 2 has, in addition to the frontal MSE 5.1, a lateral MSE 5.2 as well. A measurement beam source 6.2 is likewise adjacent to each of these MSEs 5.1 and 5.2. The MSEs 5.1 and 5.2 and the respective, adjacent measurement beam sources 6.2 are each oriented toward a mirror 6.1 which is set up in such a manner that the measurement beam of the measurement beam source 6.2 is reflected back exactly to the respective, adjacent MSE 5.1 or 5.2. The lateral MSE 5.2, with the associated adjacent measurement beam source 6.2 and the associated mirror 6.1 are oriented in such a manner that their measurement beam is substantially perpendicular to the running direction at the start/finish line 10. The frontal MSE 5.1, with the associated beam source 6.2 and the associated mirror 6.1 is oriented substantially in the running direction in such a manner that the measurement beam is substantially in, or parallel to, the running direction. Both MSE 5.1 and 5.2 are in turn connected to a timer 8 which detects the presence signals of these measurement beam receivers and—as described above—converts the same into time intervals and total times. In this embodiment, a direction light and a standby light are not included. Therefore it is not possible to calculate the reaction time of the runner. The embodiment shows that the runner starts on the right side of the central unit 9, and runs across the start/finish line 10, triggering the presence signal which marks the start, and thus triggers the time count. Now, the runner must follow a wavy line to pass around the pylons 17, must turn around at the turnaround point 4.3, and then run back in a straight line on the same side of the central unit 9. The time count ends when the runner passes through the start/finish line 10.

In the embodiment of FIG. 3, the special feature is that the time measuring unit 9 contains a further MSE 5.3 opposite the MSE 5.2. In this MSE 5.3 as well, a beam source 6.2 is arranged adjacent to a mirror 6.1 beyond the running path and functionally assigned to the same. With this configuration of the central unit 9, the runner 2 can start on one side of the central unit and arrive at the finish on the other side. Therefore he can also run a double, wavy running path (similar to FIG. 1) in this case as well. In this configuration of the central unit as well, it is possible to determine the reaction time of the runner between the ready signal 3 and the appearance at the start line 10, in addition to the running time between the first presence signal at the start line 10 and the second presence signal on the same (in this case) finish line 10.

Regarding the equipment of the central unit in this case, attention is directed to FIG. 5, which provides an enlarged view.

This configuration of the central unit also enables an advanced error detection. A microprocessor 14—that is, a separate computer and memory—is added to the central unit. For error detection purposes, the measurement beam receivers are interlocked on the right-hand side 5.2 and left-hand side 5.3 in such a manner that the presence signal of the right-hand MSE 5.2 is only evaluated as a starting signal if the standby signal of the standby light 13, and also the right-hand direction signal of the direction light 12, were previously given;

the presence signal of the left-hand MSE 5.3 is not evaluated as a starting signal if the right-hand direction signal of the direction light 12 was previously given;

the presence signal of the left-hand MSE 5.3 is not evaluated as a finish signal before the frontal MSE 5.1 has output a total of 7 presence signals—that is, one at each of the inflection points of the wavy line of the outward leg and the return path, as well as one at the turnaround point;

the presence signal of the right-hand MSE 5.2 after the start signal is no longer evaluated for the time count, but rather only for indicating an error, until the standby signal of the standby light 13 and the right- or left-hand direction signal of the direction light 12 have been shown again.

Thus, when the runner at the start of his run crosses the line on the left side of the central unit 10, or if he triggers a presence signal at the MSE 5.2 a second time on the right side, these signals are not evaluated for timing and it is possible to tell that the given rules have not been followed.

On the other hand, it is possible to determine by the number of presence signals which the runner triggers at the frontal MSE 5.1, whether he passed around all prescribed pylons 17 and turned around at the turnaround point 4.3 as intended. Furthermore, it is also possible to prespecify certain running paths, wherein the computing capacity is designed and the computer is programmed in such a manner that it calculates the accuracy of the presence signals according to their origin and their number.

The central unit is therefore equipped additionally with an input device 16, by means of which it is possible to input and save this information—that is, the origin of the presence signals (MSE frontal: 5.1, MSE lateral: 5.2, MSE lateral: 5.3) and the number of presence signals, based on the particular MSE 5.1, 5.2, 5.3, to prespecify different running paths.

The embodiment of FIG. 4 substantially corresponds to that of FIG. 3. Here, however, a modified path is shown, which allows an additional pylon and a straight outward leg and/or a straight return path of the runner.

The beam sources 6.2 are preferably lasers that emit a continuous laser beam, but which can also be operated in a pulsed manner. The computer is equipped with a time registration for the transmission time of a pulse between the beam source, optionally the associated mirror, and the MSE. This transmission time gives the distance between the devices. Therefore, it is easy to determine whether the SQ (FIG. 1) and/or the mirror (FIGS. 2-5) are positioned at the right distance and the path thus has the prescribed length.

Preferably, the central unit is equipped with a paper printer, by means of which the values determined in the microprocessor can be printed.

The invention and its importance are clear from these examples of running paths—particularly that, merely as a result of the equipment, programming, suitable positioning, and adjustment of the head station, it is possible without further electrical installations, apart from the purely mechanical placement of the reflectors, to specify not only the running paths shown, but also many others.

The invention claimed is:

1. A timing system for measuring the running time of a runner between two presence points of his running path, the system comprising:
    a measurement beam receiver (MSE) which works together with a measurement beam emitter (MSG), wherein the measurement beam thereof crosses the running path at the presence points, in such a manner that the interruption of the receipt of the measurement beam generates a runner presence signal, having a timer which is electrically connected to the measurement beam receiver (MSE) in such a manner that the timer can be controlled by the presence signals to detect and output the running time between the presence signals, wherein when the running path between a start/finish line (SZL) and a turnaround point is folded or wavy, up to and including a zigzag shape, the measurement beam receiver (MSE) and the MSG are placed at the ends of the running path, and incorporate these ends between them in such a manner that the measurement beam of the MSG is oriented in the direction of the running path, and are interrupted by the presence of the runner in at least one of the presence points, namely the turnaround point, and/or at least one inflection point of the running path.

2. The timing system according to claim 1, wherein when the running path between a start/finish line and a turnaround point is folded, the pairing of a lateral measurement beam receiver and a beam source (SQ) is arranged at the start/finish line with the measurement beam intersecting the running path perpendicular to the same.

3. The timing system according to claim 2, wherein at the start/finish line, two pairs each of one measurement beam receiver and one measurement beam emitter are arranged in the running path with measurement beams intersecting perpendicularly but with opposite measurement beam directions.

4. The timing system according to claim 3, wherein the two start measurement beam receivers and target measurement beam receivers are interlocked such that of a start MSE and a target MSE, the one which has generated a presence signal locks itself from outputting a further presence signal, and must first be unlocked to output a further presence signal.

5. The timing system according to claim 3, wherein the central unit placed shortly before the start/finish line has a direction light which is actuated manually or by a random number generator, for the purpose of outputting a right/left signal which is visible for the runner standing in front of the central unit.

6. The timing system according to claim 5, wherein the central unit placed on the start/finish line has a standby light to output a standby signal which is visible to the runner standing at the standby line in front of the central unit.

7. The timing system according to claim 1, wherein the timing system has a microprocessor to detect presence pulses and calculate time intervals between successive pulses.

8. The timing system according to claim 7, wherein a memory is included in the microprocessor, in which the running programs are stored by specifying the target origin and the target number of presence signals, and wherein by comparing the target specification and the actual presence signals as they occur, based on the origin and number, an error signal can be generated.

9. The timing system according to claim 7, wherein the microprocessor is connected to an input device for manual input of running programs by specifying the target origin and the target number of presence signals.

10. The timing system according to claim 1, wherein the measurement beam emitter is a mirror which receives a beam from a beam source placed adjacent to the measurement beam receiver, wherein a central unit is placed on one side, and the respective mirrors are placed on the other side, of the running path in such a way that the reflected measurement beam intersects the running path.

11. The timing system according to claim 10, wherein the beam source is a laser beam source integrated into the central unit.

12. The timing system according to claim 10, wherein pairings of multiple measurement beam receivers and SQs are integrated into the common central unit, wherein the central unit is placed on one side, and the respective mirrors on the other side, of the running path in such a manner, and wherein the central unit is placed at the start / finish line.

13. The timing system according to claim 10, wherein the central unit is equipped with a rangefinder which is oriented toward the mirror at the turnaround point, and is connected to a microprocessor in such a manner that the determined distance is compared in the microprocessor with a stored target specification, and in the event of a discrepancy an error signal is output, or the evaluation of one or more presence signals is blocked.

14. The timing system according to claim 1, wherein the central unit is equipped with a printer to print out the determined times.

15. The timing system according to claim 2, wherein a start/finish MSE is integrated along with the measurement beam receiver into a common central unit.

16. The timing system according to claim 3, wherein both the start measurement beam receiver and the finish measurement beam receiver are integrated along with the longitudinal measurement beam receiver into a common central unit.

17. The timing system according to claim 4, wherein the subsequent presence signal of the other start MSE and/or target MSE unlocks the further presence signal.

18. The timing system according to claim 5, wherein, as a result of the right/left signal, the start/finish measurement beam receiver oriented to the respective left and/or right side of the central unit is armed to output the presence signal.

19. The timing system according to claim 6, wherein the output of the right or left signal is activated by the standby signal.

20. The timing system according to claim 10, the beam source and the measurement beam receiver are integrated into a common central unit.

21. The timing system according to claim 13, wherein the MSE and the beam source which is oriented toward the mirror at the reversal point are part of the rangefinder for the reason that the distance between the beam source and the mirror is determined, when a beam pulse of the measurement beam is emitted, from its transmission time or from the angle between the emitted and the reflected measurement beam.

\* \* \* \* \*